United States Patent
Lin et al.

(10) Patent No.: US 11,700,395 B2
(45) Date of Patent: Jul. 11, 2023

(54) METHOD AND APPARATUS OF MATRIX BASED INTRA PREDICTION IN IMAGE AND VIDEO PROCESSING

(71) Applicant: HFI Innovation Inc., Zhubei (TW)

(72) Inventors: Zhi-Yi Lin, Hsinchu (TW); Tzu-Der Chuang, Hsinchu (TW); Ching-Yeh Chen, Hsinchu (TW); Chih-Wei Hsu, Hsinchu (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 17/619,788

(22) PCT Filed: Jun. 24, 2020

(86) PCT No.: PCT/CN2020/098269
§ 371 (c)(1),
(2) Date: Dec. 16, 2021

(87) PCT Pub. No.: WO2020/259630
PCT Pub. Date: Dec. 30, 2020

(65) Prior Publication Data
US 2022/0210470 A1 Jun. 30, 2022

Related U.S. Application Data

(60) Provisional application No. 62/868,013, filed on Jun. 28, 2019.

(51) Int. Cl.
*H04N 19/70* (2014.01)
*H04N 19/132* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/593; H04N 19/105; H04N 19/11; H04N 19/132; H04N 19/172;
(Continued)

(56) References Cited

U.S. PATENT DOCUMENTS 9,503,727 B2   11/2016   Seregin et al.
10,440,340 B2  10/2019   Ye et al.
(Continued)

FOREIGN PATENT DOCUMENTS

CN    104137540 A    11/2014
CN    107483932 A    12/2017
(Continued)

OTHER PUBLICATIONS

International Search Report and Written Opinion dated Oct. 13, 2020, issued in application No. PCT/CN2020/098269.
(Continued)

*Primary Examiner* — Albert Kir
(74) *Attorney, Agent, or Firm* — Oblon, McClelland, Maier & Neustadt, L.L.P.

(57) ABSTRACT

An image or video processing method comprises receiving input data of a current block, mapping an MIP mode index to a default mode, and encoding or decoding the current block by referencing the default mode. Another image or video processing method comprises receiving input data of a current block coded or to be coded by an MIP mode, and parsing or signaling a transpose flag for the current block indicating whether transposing is applied in coding the current block. Reference samples of the current block are prepared from neighboring boundary samples according to the transpose flag. A matrix is selected to be multiplied to the reference samples to generate predicted samples. A transposing process is adaptively applied to the current block (Continued)

according to the transpose flag, and the predicted samples are used to encode or decode the current block.

12 Claims, 8 Drawing Sheets

(51) Int. Cl.
| | |
|---|---|
| *H04N 19/105* | (2014.01) |
| *H04N 19/593* | (2014.01) |
| *H04N 19/11* | (2014.01) |
| *H04N 19/172* | (2014.01) |
| *H04N 19/176* | (2014.01) |
| *H04N 19/18* | (2014.01) |
| *H04N 19/186* | (2014.01) |
| *H04N 19/61* | (2014.01) |

(52) U.S. Cl.
CPC ......... *H04N 19/132* (2014.11); *H04N 19/172* (2014.11); *H04N 19/176* (2014.11); *H04N 19/18* (2014.11); *H04N 19/186* (2014.11); *H04N 19/61* (2014.11); *H04N 19/70* (2014.11)

(58) Field of Classification Search
CPC .... H04N 19/176; H04N 19/18; H04N 19/186; H04N 19/61; H04N 19/70
USPC ..................................................... 375/240.12
See application file for complete search history.

(56) References Cited

U.S. PATENT DOCUMENTS

| | | | |
|---|---|---|---|
| 11,039,130 | B2 | 6/2021 | Lee et al. |
| 2017/0272745 | A1 | 9/2017 | Liu et al. |
| 2019/0116381 | A1 | 4/2019 | Lee et al. |
| 2021/0092405 | A1* | 3/2021 | Biatek ................... H04N 19/159 |
| 2021/0385438 | A1* | 12/2021 | Deng ...................... H04N 19/18 |
| 2022/0060751 | A1* | 2/2022 | Nam ..................... H04N 19/593 |
| 2022/0078449 | A1* | 3/2022 | Salehifar .............. H04N 19/132 |
| 2022/0116606 | A1* | 4/2022 | Pfaff ....................... H04N 19/11 |
| 2022/0224913 | A1* | 7/2022 | Wang ................... H04N 19/146 |
| 2022/0329800 | A1* | 10/2022 | Ray ....................... H04N 19/176 |

FOREIGN PATENT DOCUMENTS

| | | |
|---|---|---|
| CN | 108337519 A | 7/2018 |
| CN | 108886617 A | 11/2018 |
| CN | 109891883 A | 6/2019 |
| WO | WO-2020246803 A1 * 12/2020 ........... H04N 19/105 |

OTHER PUBLICATIONS

Jiang, H.Y., et al.; "CE3-related: Advanced MPM based on intra reference line selection scheme;" Joint Video Experts Team (JVET) of ITU-T SG 16 WP 3 and ISO/IEC JTC 1/SC 29/WG 11; Jul. 2018; pp. 1-3.

Ramasubramonian, Adarsh K., et al.; "CE3-3.1.1: Two MPM modes and shape dependency (Test 3.1.1);" Joint Video Exploration Team (JVET) of ITU-T SG 16 WP 3 and ISO/IEC JTC 1/SC 29/WG 11; Jul. 2018; pp. 1-5.

Chinese language Notice of Allowance dated Jun. 17, 2021, issued in application No. TW 109121447.

* cited by examiner

METHOD AND APPARATUS OF MATRIX BASED INTRA PREDICTION IN IMAGE AND VIDEO PROCESSING

CROSS REFERENCE TO RELATED APPLICATIONS

The present invention claims priority to U.S. Provisional Patent Application, Ser. No. 62/868,013, filed on Jun. 28, 2019, entitled "Methods for Simplification of Matrix based Intra Prediction—MPM removal, MIP mode mapping, reduction of number of MIP modes". The U.S. Provisional Patent Application is hereby incorporated by reference in its entirety.

FIELD OF THE INVENTION

The present invention relates to intra prediction in image and video processing. In particular, the present invention relates to matrix based intra prediction for generating intra predictors by matrix multiplication.

BACKGROUND AND RELATED ART

Intra prediction has been widely adopted in various image and video coding standards to process an initial picture or to periodically insert Intra coded pictures (I-pictures) or Intra coded blocks (I-blocks) for random access or for alleviation of error propagation. Intra prediction is usually designed to exploit spatial features in the image or video picture such as smooth area, vertical line or edge, horizontal line or edge, and diagonal line or edge. Intra prediction is also useful for regions with high motion or scene changes as intra prediction is more efficient than inter prediction for coding these regions. Intra prediction exploits the spatial correlation within a picture or within a picture region. For a block-based video coding standard, intra prediction for a current block relies upon pixels in neighboring blocks that have been processed. For example, if blocks in a picture or picture region are sequentially processed row by row from top to bottom and from left to right, neighboring blocks on the top and neighboring blocks on the left of the current block can be used to form an intra predictor for pixels inside the current block.

Figure 1:
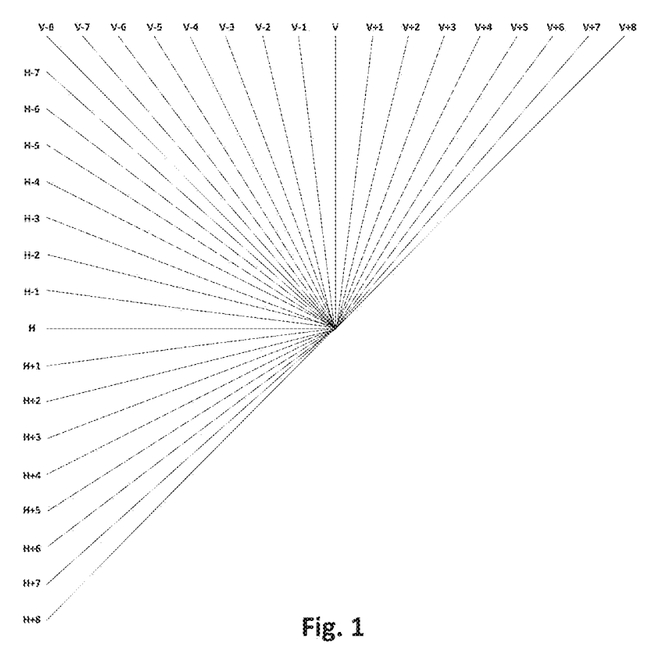
FIG. 1 illustrates 33 angular intra prediction modes supported in the HEVC standard.
Figure 2:
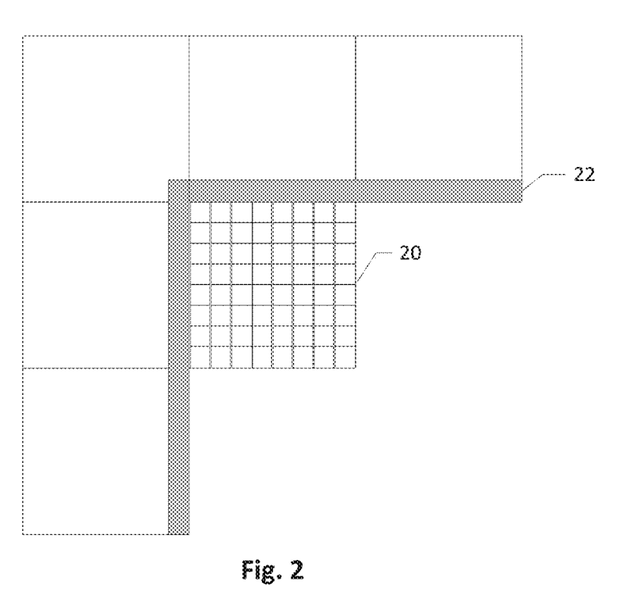
FIG. 2 illustrates exemplary reference samples filtered by an intra smoothing filter for deriving an intra predictor for a current block.

The High-Efficiency Video Coding (HEVC) standard supports 35 intra prediction modes including 33 angular modes, DC mode, and Planar mode. FIG. 1 illustrates the prediction directions for the 33 angular intra prediction modes of the HEVC standard, where H represents the Horizontal direction mode and V represents the Vertical direction mode. An intra predictor for a current block coded or to be coded by intra prediction of the HEVC standard is generated by three steps including intra smoothing filter, intra prediction, and intra gradient filter. FIG. 2 illustrates exemplary reference samples filtered by an intra smoothing filter for deriving an intra predictor for a current block. A smoothing operation is applied to reference samples 22 of the current block 20 before calculating the intra predictor for the current block 20. The smoothing operation reduces the discontinuities introduced by some of the intra prediction modes by applying the intra smoothing filter to the reference samples 22 in a left neighboring column and an above neighboring row of the current block 20. This smoothing operation is adaptively applied depending on an intra prediction mode and the size of the current block.

The second step of intra prediction is to derive the intra predictor from neighboring boundary samples according to one intra prediction mode selected from the 35 intra prediction modes supported by the HEVC standard. If an angular mode is selected, the value of each sample in the current block is predicted by extrapolating the samples from the neighboring boundary samples according to the prediction direction of the selected angular mode. The value of each sample in the current block is calculated by assuming an amplitude surface with a horizontal and vertical smooth gradient derived from the neighboring boundaries samples of the neighboring blocks if Planar mode is selected. The value of each sample of the current block is an average of the neighboring boundary samples if DC mode is selected.

An intra gradient filter is applied to samples at the left and top boundaries of the current block in the third step of intra prediction if the intra prediction mode is one of DC, Horizontal, and Vertical modes. The concept of applying the intra gradient filter is to utilize the gradient information along the intra prediction direction to improve the quality of the intra predictor. The samples in the first row and first column of the current block are filtered by the intra gradient filter when the selected intra prediction mode is DC mode. The samples in the first row are filtered by the intra gradient filter when the selected intra prediction mode is Horizontal mode, and the samples in the first column are filtered by the intra gradient filter if the selected intra prediction mode is Vertical mode.

The selected intra prediction mode is signaled explicitly in a video bitstream or inferred from previously decoded modes of the above and left neighboring blocks of the current block. The intra prediction modes of the two neighboring blocks are included in a set of three Most Probable Modes (MPMs). A first MPM flag is signaled to indicate whether the selected mode is identical to one of the three MPMs, if so, a MPM index is sent to indicate which of the three MPMs is selected; if the first MPM flag is false, the selected mode is explicitly signaled using a 5-bit fixed length codeword.

Figure 3:
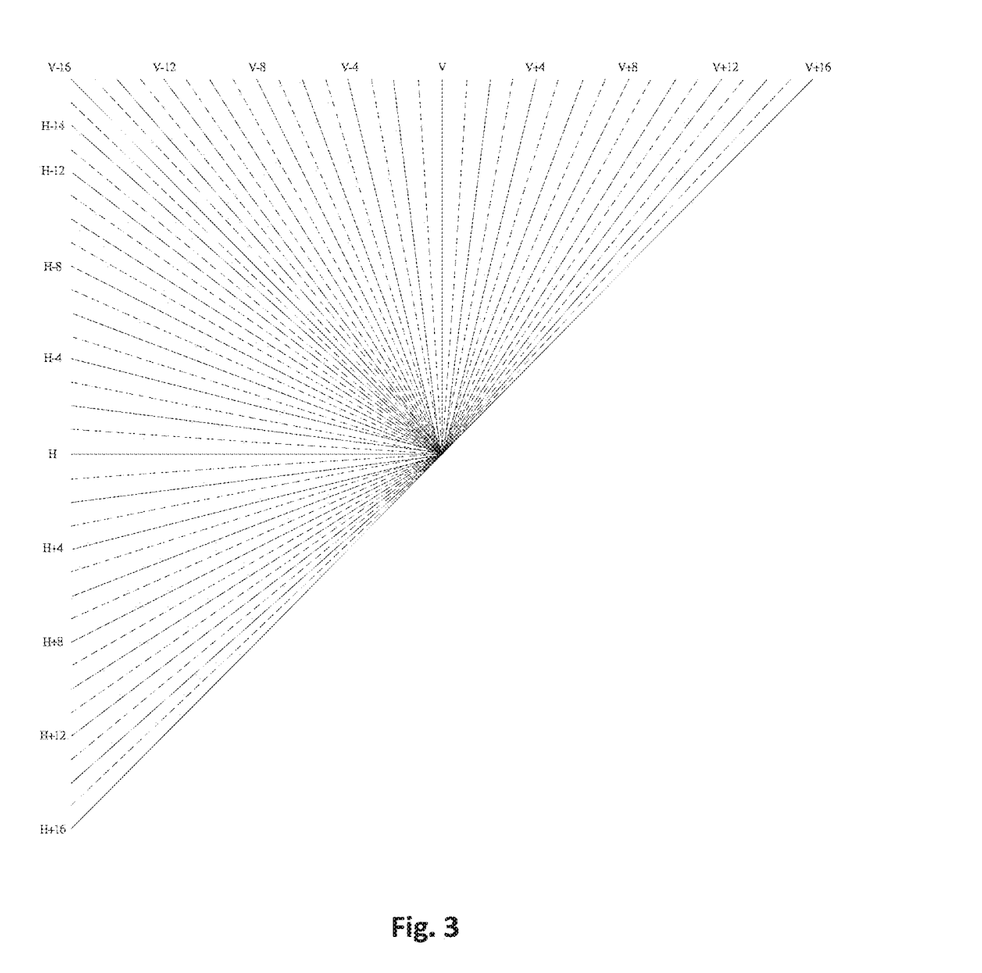
FIG. 3 illustrates an example of 65 angular intra prediction modes for regular intra prediction.

The 33 angular modes shown in FIG. 1 can be expanded to a general case with more or less angular modes, where each of the angular modes can be represented by mode H+k or mode V+k, where H represents the direction of Horizontal mode, V represents the direction of Vertical mode, and k=0, +−1, +−2, . . . +−K. An example of 65 angular modes for intra prediction is shown in FIG. 3, where k is ranged from −16 to 16, and mode H−16 and mode V−16 are the same mode as this mode refers to the prediction direction from an upper-left corner to the center of the current block. FIG. 3 illustrates the 65 angular intra prediction modes with additional 32 angular modes in between the original 33 angular modes supported by the HEVC standard as shown in FIG. 1. The 65 angular modes in FIG. 3 include modes H+16 to H−15 from bottom to top at the left boundary of the block and modes V−16 to V+16 from left to right at the upper boundary of the block.

In the up-coming video coding standard Versatile Video Coding (VVC), a Matrix-based Intra Prediction (MIP) method is proposed for square and rectangular blocks. For predicting samples of a current block with a width equal to W and a height equal to H by the MIP method, the input includes one line of H reconstructed neighboring boundary samples located at the left of the current block and one line of W reconstructed neighboring boundary samples located above the current block. The MIP method generates a prediction signal of the current block based on the following six steps. In the first step, reference samples of the current block are prepared. For example, four samples out of the reconstructed neighboring boundary samples are extracted by averaging if W and H are both equal to 4; otherwise eight samples out of the reconstructed neighboring boundary samples are extracted by averaging. In the second step, a matrix is selected for the current block according to the block size and MIP mode index. In the third step, matrix vector multiplication, followed by addition of an offset vector, is carried out with the prepared reference samples as an input. The result is a reduced prediction signal on a sub-sampled set of samples in the current block. In the fourth step, the reduced prediction signal is modified by transposing if necessary. In the fifth step, the prediction signal at the remaining positions is generated from the reduced prediction signal on the sub-sampled set by up-sampling, for example, using linear interpolation such as a single step linear interpolation in each direction. Up-sampling is not required if the current block is a 4×4 block. In the sixth step, all prediction samples in the current block after up-sampling are clipped to a rational range.

The matrices and offset vectors used to generate the prediction signal are taken from three sets of matrices $S_0$, $S_1$, $S_2$. The first set $S_0$ consists of 18 matrices $A_0^i$, $i \in \{0, \ldots, 17\}$, each matrix has 16 rows and 4 columns, and 18 offset vectors $b_0^i$, $i \in \{0, \ldots, 17\}$, each offset vector has a size of 16. Matrices and offset vectors of the first set $S_0$ are used for coding blocks with size equal to 4×4. The second set $S_1$ consists of 10 matrices $A_1^i$, $i \in \{0, \ldots, 9\}$, each matrix has 16 rows and 8 columns, and 10 offset vectors $b_1^i$, $i \in \{0, \ldots, 9\}$, each offset vector has a size of 16. Matrices and offset vectors of the second set $S_1$ are used for coding blocks with sizes equal to 4×8, 8×4, and 8×8. Finally, the third set $S_2$ consists of 6 matrices $A_2^i$, $i \in \{0, \ldots, 5\}$, each matrix has 64 rows and 8 columns, and 6 offset vectors $b_2^i$, $i \in \{0, \ldots, 5\}$, each offset vector has a size of 64. Matrices and offset vectors of the third set $S_2$ or parts of these matrices and offset vectors are used for coding all blocks with other block sizes. The total number of multiplications required in the matrix computation is always smaller than or equal to 4×W×H. In other words, at most four multiplications per sample are required in the MIP method.

Preparing Reference Samples In the first step of the MIP method, the top input boundaries $bdry^{top}$ and the left input boundaries $bdry^{left}$ are used to generate reduced top boundaries $bdry_{red}^{top}$ and reduced left boundaries $bdry_{red}^{left}$. Here, $bdry_{red}^{top}$ and $bdry_{red}^{left}$ both consist of 2 samples in the case of a 4×4 block and both consist of 4 samples in all other cases.

In the case of a 4×4 block, for $0 \leq i < 2$, the reduced top boundaries $bdry_{red}^{top}$ are defined as:

$$bdry_{red}^{top}[i] = \left(\left(\sum_{j=0}^{1} bdry^{top}[i \cdot 2 + j]\right) + 1\right) \gg 1.$$

and the reduced left boundaries $bdry_{red}^{left}$ are defined analogously.

Otherwise, if the block-width W is given as $W = 4 \cdot 2^k$, for $0 \leq i < 4$, the reduced top boundaries $bdry_{red}^{top}$ are defines as:

$$bdry_{red}^{top}[i] = \left(\left(\sum_{j=0}^{2^k-1} bdry^{top}[i \cdot 2^k + j]\right) + (1 \ll (k-1))\right) \gg k.$$

and the reduced left boundaries $bdry_{red}^{left}$ are defined analogously.

The two reduced boundaries $bdry_{red}^{top}$ and $bdry_{red}^{left}$ are concatenated to form a reduced boundary vector $bdry_{red}$. The reduced boundary vector has a size of 4 for any 4×4 block and the reduced boundary vector has a size of 8 for any of the other block sizes. If mode refers to the MIP-mode, for example, there are 35 MIP-modes in the first matrix set $S_0$, 19 MIP-modes in the second matrix set $S_1$, and 11 MIP-modes in the third matrix set $S_2$, this concatenation for the reduced boundary vector is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6. \end{cases}$$

Finally, for the interpolation of the sub-sampled prediction signal, a second version of the reduced boundaries is needed for large blocks. Namely, if $\min(W, H) > 8$ and $W \geq H$, one writes $W = 8 * 2^l$, and, for $0 \leq i < 8$, the second version of the reduced boundaries is defined as:

$$bdry_{redII}^{top}[i] = \left(\left(\sum_{j=0}^{2^l-1} bdry^{top}[i \cdot 2^l + j]\right) + (1 \ll (l-1))\right) \gg l.$$

If $\min(W, H) > 8$ and $H > W$, the second version of the reduced boundaries $bdry_{red}^{left}$ is defined analogously.

Generation of Reduced Prediction Signal by Matrix Vector Multiplication A reduced prediction signal $pred_{red}$ is generated by the reduced boundary vector, and this reduced prediction signal is a signal on the down-sampled block with width $W_{red}$ and height $H_{red}$. The width and height of the down-sampled block $W_{red}$ and $H_{red}$ are defined as:

$$W_{red} = \begin{cases} 4 & \text{for } \max(W, H) \leq 8 \\ \min(W, 8) & \text{for } \max(W, H) > 8. \end{cases}$$

$$H_{red} = \begin{cases} 4 & \text{for } \max(W, H) \leq 8 \\ \min(H, 8) & \text{for } \max(W, H) > 8. \end{cases}$$

The reduced prediction signal $pred_{red}$ is computed by calculating a matrix vector product and adding an offset:

$$pred_{red} = A \cdot bdry_{red} + b.$$

In the above equation, A is a matrix that has $W_{red} \cdot H_{red}$ rows and 4 columns if W=H=4 and 8 columns in all other cases, and b is an offset vector of size $W_{red} \cdot H_{red}$. The matrix A and the vector b are taken from one of the matrix sets $S_0$, $S_1$, $S_2$ as follows. An index $idx = idx(W, H)$ is defined as follows:

$$idx(W, H) = \begin{cases} 0 & \text{for } W = H = 4 \\ 1 & \text{for } \max(W, H) = 8 \\ 2 & \text{for } \max(W, H) > 8. \end{cases}$$

Moreover, one puts m as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6. \end{cases}$$

If the index idx≤1 or idx=2 and min(W, H)>4, the matrix A and the vector b are defined as $A = A_{idx}^m$ and $b = b_{idx}^m$. In the case that idx=2 and min(W, H)=4, one lets A to be the matrix that arises by leaving out every row of $A_{idx}^m$ that, in the case W=4, corresponds to an odd x-coordinate in the down-sampled block, or, in the case H=4, corresponds to an odd y-coordinate in the down-sampled block.

Finally, the reduced prediction signal $pred_{red}$ is replaced by its transpose in the following cases: W=H=4 and mode≥18, max(W, H)=8 and mode≥10, and max(W, H)>8 and mode≥6. The number of multiplications required for calculation of the reduced prediction signal is 4 in the case of W=H=4 since in this case A has 4 columns and 16 rows. In all other cases, A has 8 columns and $W_{red} \cdot H_{red}$ rows and one immediately verifies that in these cases $8 \cdot W_{red} \cdot H_{red} \leq 4 \cdot W \cdot H$ multiplications are required. In other words, at most 4 multiplications per sample are required to compute the reduced prediction signal $pred_{red}$.

Single Step Linear Interpolation For a current block with at least a width W and height H larger than or equal to 8, a prediction signal for the current block arises from the reduced prediction signal $pred_{red}$ on $W_{red} \times H_{red}$ by linear interpretation. Depending on the block shape, linear interpolation is performed in vertical, horizontal or both directions. In cases when linear interpolation is applied in both directions, the horizontal direction is first applied if W<H, otherwise the vertical direction is first applied.

Consider without loss of generality a current block with at least a width W and height H larger than or equal to 8 and the width W is larger than or equal to the height H, the one-dimensional linear interpolation is performed as follows. Without loss of generality, it suffices to describe linear interpolation in the vertical direction. First, the reduced prediction signal is extended to the top by the boundary signal. The vertical up-sampling factor is defined as: $U_{ver} = H/H_{red}$ and $U_{ver} = 2^{u_{ver}} > 1$. The extended reduced prediction signal is then defined by:

$$pred_{red}[x][-1] = \begin{cases} bdry_{red}^{top}[x] & \text{for } W = 8 \\ bdry_{redII}^{top}[x] & \text{for } W > 8. \end{cases}$$

Based on this extended reduced prediction signal, the vertically linear interpolated prediction signal is generated by:

$$pred_{red}^{ups,ver}[x][U_{ver} \cdot y + k] =$$

$$\left( (U_{ver} - k - 1) \cdot pred_{red}[x][y-1] + (k+1) \cdot pred_{red}[x][y] + \frac{U_{ver}}{2} \right) \gg u_{ver}$$

for $0 \leq x < W_{red}$, $0 \leq y < H_{red}$ and $0 \leq k < U_{ver}$.

A final stage of generating the prediction signal for the current block encoded or decoded by the MIP method is clipping. After up-sampling by linear interpolation, a clipping process is applied to the up-sampled values of the prediction signal to clip all values within a rational range.

BRIEF SUMMARY OF THE INVENTION

Methods and apparatuses for processing image or video data in an image or video coding system are disclosed. Embodiments of the image or video coding system receive input data associated with a current block in a current picture, map an MIP mode index of an MIP block to a default mode, and encode or decode the current block by referencing the default mode. The MIP block is encoded or decoded by an MIP mode according to predicted samples generated by a matrix and neighboring boundary samples in the current picture. In one embodiment, the MIP block is encoded or decoded by deriving reference samples from the neighboring boundary samples of the MIP block, generating intermediate predicted samples by multiplying the reference samples and the matrix, clipping the intermediate predicted samples to a rational range, and up-sampling the clipped intermediate predicted samples to generate the predicted samples of the MIP block. The step of deriving reference samples may include down-sampling the neighboring boundary samples of the MIP block to generate the reference samples. The step of deriving reference samples may include extracting the reference samples by averaging the neighboring boundary samples of the MIP block. The step of generating intermediate predicted samples includes adding an offset after multiplying the reference samples and the matrix.

An example of the default mode in MIP mode mapping is Planar mode and another example of the default mode is DC mode. In one embodiment of MIP mode mapping, the current block is a chrominance (chroma) block coded or to be coded in Direct Mode (DM) and the MIP block is a corresponding luminance (luma) block coded by the MIP mode. DM derivation of the current block maps the MIP mode index of the corresponding luma block to the default mode so the current block is encoded or decoded according to the default mode. In another embodiment of MIP mode mapping, the current block is coded or to be coded by intra prediction and the MIP block is a neighboring block of the current block coded by the MIP mode. Intra Most Probable Mode (MPM) derivation of the current block maps the MIP mode index of the neighboring block to the default mode. In yet another embodiment, the current block is the MIP block coded by the MIP mode and secondary transform is applied to a transform block in the current block. The step of encoding or decoding the current block by referencing the default mode includes selecting a secondary transform set according to the default mode, determining a transform matrix of the selected secondary transform set, and transforming primary transform coefficients of the transform block into secondary transform coefficients based on the transform matrix or transforming secondary transform coefficients of the transform block into primary transform coefficients based on the transform matrix.

Some embodiments of the image or video coding system receive input data associated with a current block coded or to be coded by a MIP mode in a current picture, determine whether transposing is applied in coding the current block by the MIP mode, derive reference samples of the current block from neighboring boundary samples of the current block in the current picture according to whether transposing is applied, and generate predicted samples of the current block. The predicted samples are generated by selecting a matrix for the current block from a matrix set of the current block, multiplying the reference samples and the matrix, and adaptively performing a transposing process according to whether transposing is applied. The transposing process replaces the predicted samples of the current block by a transpose of the predicted samples when transposing is applied. A transpose flag for the current block indicating whether transposing is applied when coding the current block is signaled in or parsed from a video bitstream. The image or video coding system encodes or decodes the current block in the current picture according to the predicted samples of the current block.

In one embodiment, the image or video coding system clips the predicted samples to a rational range and up-samples the clipped predicted samples. For example, the rational range is [0, 1<<BitDepth−1], where BitDepth is an internal bit depth of the video coding system. The transposing process is adaptively performed on the clipped predicted samples of the current block before up-sampling in this embodiment.

The image or video coding system signals or parses a matrix index for the current block indicating which matrix is selected from the matrix set of the current block. The matrix set is determined based on a size of the current block. In an example of a video encoder, MIP mode information of the current block is signaled by first signaling the transpose flag and then signaling the matrix index. Similarly, in a video decoder, MIP mode information of the current block is parsed by first parsing the transpose flag and then parsing the matrix index. In one embodiment, syntax used for signaling the matrix index is coded in a fixed length codeword. A specific embodiment of maximizing the coding efficiency of the fixed length codeword, a number of matrices in the matrix set of the current block is a power-of-two number.

The step of deriving reference samples of the current block from neighboring boundary samples of the current block may further include obtaining top boundary reference samples and left boundary reference samples, reducing the top boundary reference samples and left boundary reference samples into reduced top boundary samples and reduced left boundary samples, and concatenating the reduced top boundary samples and the reduced left boundary samples according to whether transposing is applied.

Aspects of the disclosure further provide an apparatus in the image or video coding system for compression image or video data. Embodiments of the apparatus map all MIP mode indices of MIP blocks to a default mode for DM derivation, intra MPM derivation or secondary transform set selection. Some other embodiments of the apparatus signal or parse a transpose flag for each MIP coded block indicating whether transposing is applied in coding the MIP coded block.

In the MIP mode mapping method, a default mode is always selected in order to eliminate the use of the mapping table for converting MIP mode indices to regular intra prediction mode indices. The computational complexity of the image or video coding system is reduced by mapping all MIP mode indices to a default mode. An advantage of signaling a transpose flag for each MIP coded block is to remove the matric index derivation and transpose flag derivation at decoder. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Figure 8:
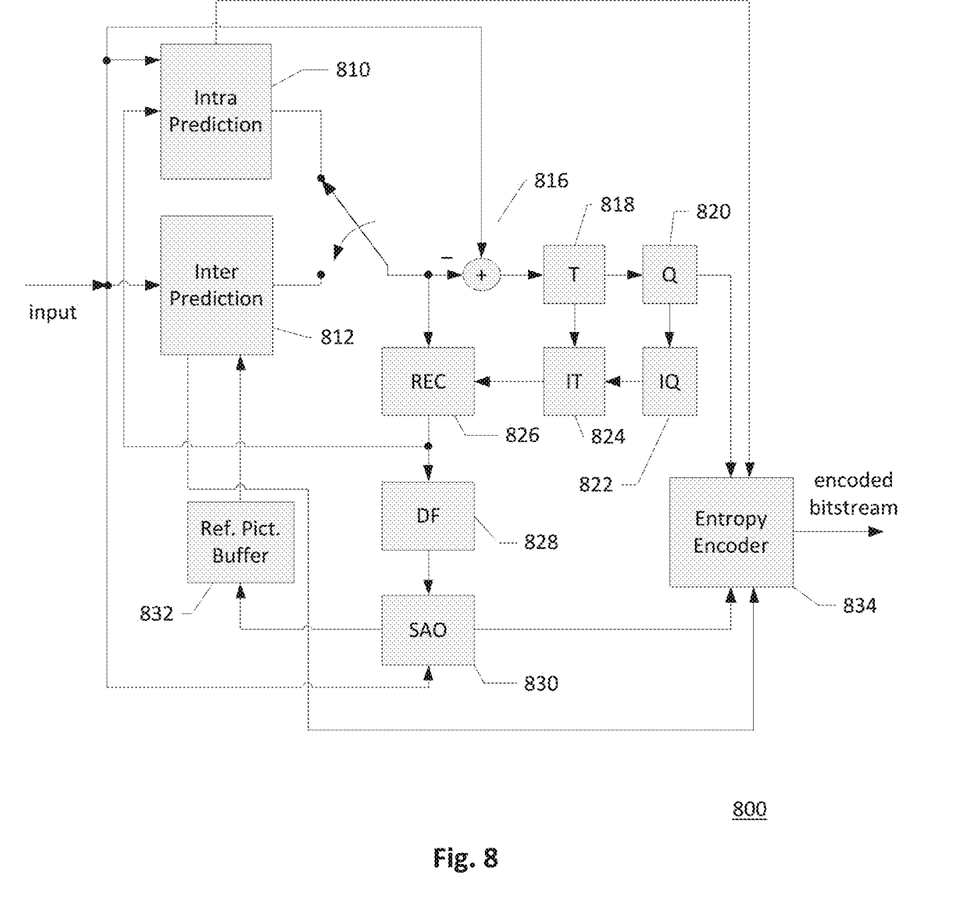
FIG. 8 illustrates an exemplary system block diagram for a video encoding system incorporating the intra prediction method according to embodiments of the present invention.
Figure 9:
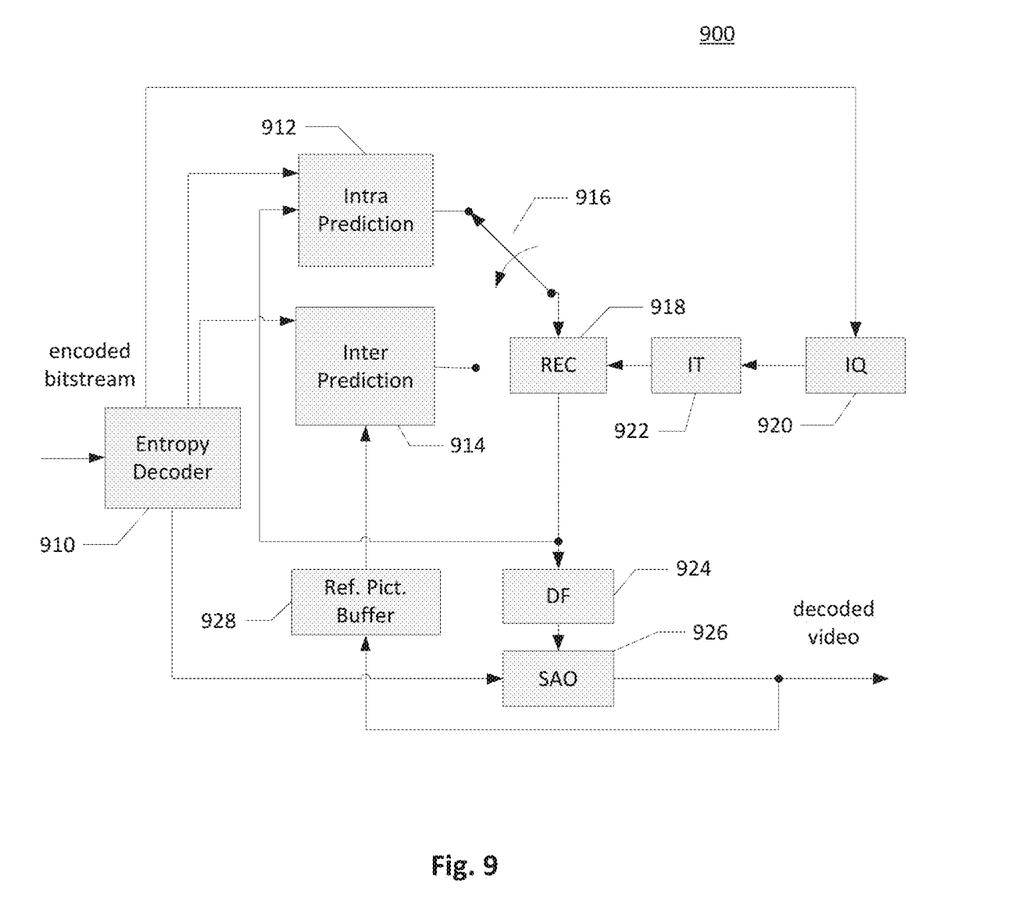
FIG. 9 illustrates an exemplary system block diagram for a video decoding system incorporating the intra prediction method according to embodiments of the present invention.

In this disclosure, the present application describes various image or video processing methods for reducing computational complexity of processing image or video blocks coded in a Matrix-based Intra Prediction (MIP) mode. An exemplary video encoder and decoder implementing one or a combination of the video processing methods are illustrated in FIGS. 8 and 9 respectively. Systems and methods described herein are organized in sections as follows. The section "MIP Mode Mapping" demonstrates exemplary methods of mapping an MIP mode index to a default mode for Direct Mode (DM) derivation, intra Most Probable Mode (MPM) derivation, or secondary transform set selection. The section "Transpose Flag Signaling" describes exemplary methods of signaling or parsing a transpose flag for each block coded by the MIP mode. The section "MPM Removal in MIP Method" describes exemplary MIP methods without using MPM for MIP mode signaling. The section "Power-of-two Number of MIP Modes" describes exemplary methods of using power-of-two numbers of MIP modes. The section "Video Encoder and Decoder Implementations" together with FIGS. 8 and 9 illustrate a video encoding system and a video decoding system incorporating one or a combination of the described video processing methods of the present invention.

MIP Mode Mapping In the conventional Matrix-based Intra Prediction (MIP) method, a mapping table is used to map a MIP mode index to a regular intra mode index when a regular intra block is referencing an MIP coded block. In an example, a current block is coded by a regular intra prediction mode, and a neighboring block coded by the MIP mode is referenced in the Most Probable Mode (MPM) derivation process. An MIP mode index of the neighboring block is first obtained, and based on the size of the neighboring block the MIP mode index of the neighboring block is mapped to a regular intra mode index according to Table 1 for the MPM derivation of the current block. For example, an MIP size ID of the neighboring block is $S_1$ as the neighboring block is an 8×8 block and the MIP mode index of the neighboring block is 6, the MIP mode index of 6 is thus mapped to a regular intra mode index of 18 based on Table 1.

vector of a transform block to a reduced dimensional vector in a different space. A secondary transform set for an intra coded block is selected from four transform sets with transform set indices 0, 1, 2, and 3 according to an intra prediction mode of the intra coded block. An intra prediction mode for the luma component of an intra coded block is used to select the secondary transform set if one of three Cross Component Linear Model (CCLM) modes for chroma components is indicated. For example, the secondary transform set selection is based on the intra prediction mode as shown in Table 2. IntraPredMode in Table 2 is the intra prediction mode index of the current block, which has a range of [−14, 83] including regular intra prediction modes and wide angle intra prediction modes.

TABLE 1

MIP Mode Index Mapping Table

| | | MIP Mode | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 |
| MipSizeId (S0, S1, S2) | S0 | 0 | 18 | 18 | 0 | 18 | 0 | 12 | 0 | 18 | 2 | 18 | 12 | 18 | 18 | 1 | 18 | 18 |
| | S1 | 0 | 1 | 0 | 1 | 0 | 22 | 18 | 18 | 1 | 0 | 1 | 0 | 1 | 0 | 44 | 0 | 50 |
| | S2 | 1 | 1 | 1 | 1 | 18 | 0 | 1 | 0 | 1 | 50 | 0 | | | | | | |

| | | MIP Mode | | | | | | | | | | | | | | | | |
|---|---|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 | 32 | 33 | 34 |
| MipSizeId (S0, S1, S2) | S0 | 0 | 0 | 50 | 0 | 50 | 0 | 56 | 0 | 50 | 66 | 50 | 56 | 50 | 50 | 1 | 50 | 50 | 50 |
| | S1 | 1 | 0 | | | | | | | | | | | | | | | | |
| | S2 | | | | | | | | | | | | | | | | | | |

Embodiments of the present invention remove the use of the MIP mode index mapping table by mapping all MIP mode indices to a default mode. The default mode is DC mode according to some embodiments, and the default mode is Planar mode according to some other embodiments. The computational complexity of video encoding or decoding is reduced as the table used to map MIP mode indices to regular intra mode indices is no longer required in Direct Mode (DM) derivation, intra MPM derivation, or secondary transform set selection.

Some embodiments of the present invention only enable the MIP method in the luminance (luma) component. The MIP method cannot be used to predict corresponding chrominance (chroma) components. In one embodiment, a current chroma block is an intra coded block or to be coded in intra prediction and a corresponding luma block of the current chroma block is coded by the MIP mode, the MIP mode index of the corresponding luma block is mapped to Planar mode for DM derivation of the current chroma block. In another embodiment, a current block is coded or to be coded in intra prediction, if any of the neighboring blocks of the current block used for intra MPM derivation is coded by the MIP mode, the MIP mode index of the neighboring block is mapped to Planar mode in intra MPM derivation.

The method of mapping all MIP mode indices to a default mode is also applied to secondary transform set selection according to another embodiment. The Reduced Secondary Transform (RST) is a new coding tool proposed in VVC, which is also known as Low Frequency Non-Separable Transform (LFNST), RST improves the coding efficiency of intra coded blocks by mapping an original dimensional

TABLE 2

Transform set selection table

| IntraPredMode | Transform Set Index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

In this embodiment, when a current block is coded by the MIP mode and secondary transform is applied to a transform block of the current block, the MIP mode index of the current block is mapped into Plannar mode (i.e. mode 0) for secondary transform set selection. The secondary transform set with a transform set index equals equal to 0 is thus selected for the current block coded in the MIP mode according to Table 2. Each secondary transform set consists of two transform matrices and an index is signaled to indicate which transform matrix is used. In this embodiment, one transform matrix of the secondary transform set with a transform set index equals to 0 is selected from the two transform matrices to transform primary transform coefficients of the transform block into secondary transform coefficients at the encoder side, or transform secondary transform coefficients of the transform block into primary transform coefficients at the decoder side.

Figure 5:
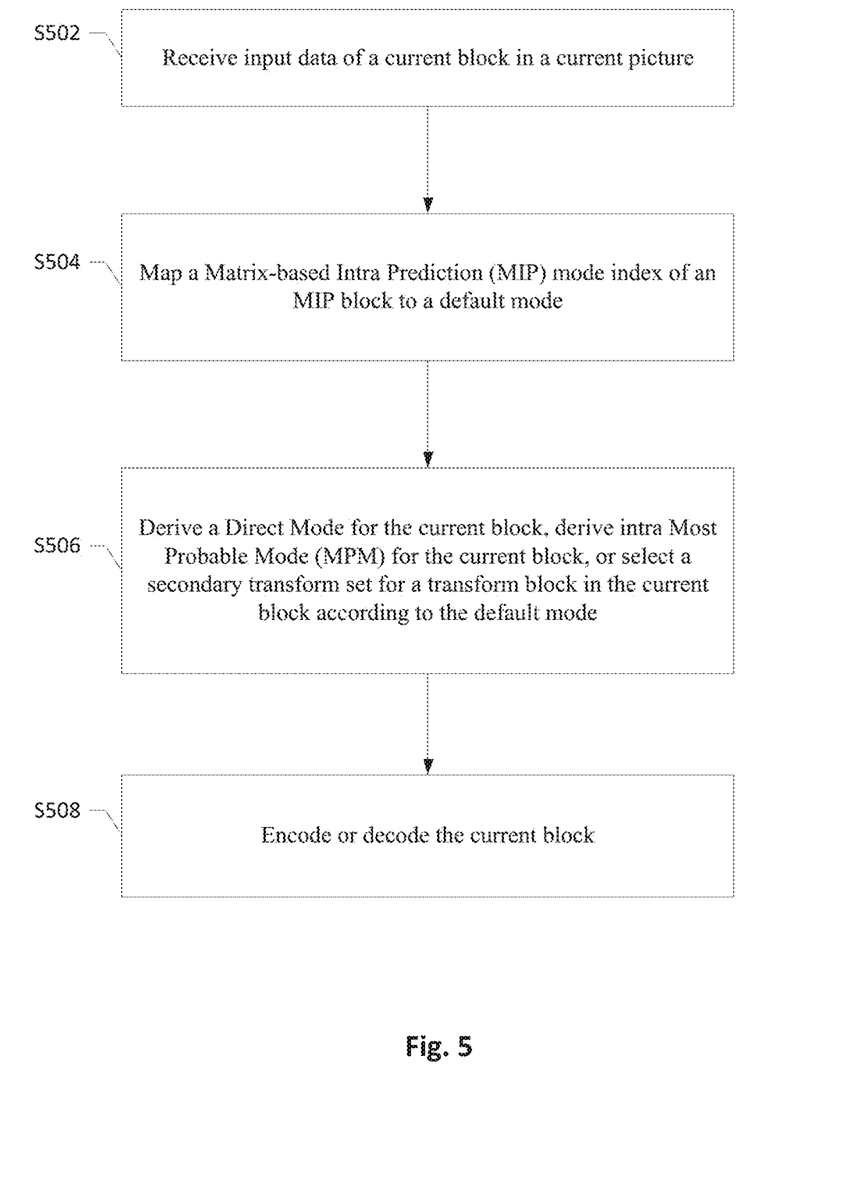
FIG. 5 is a flowchart illustrating an exemplary image or video processing method for encoding or decoding a current block by mapping an MIP mode index to a default mode according to an embodiment of MIP mode mapping.

FIG. 5 is a flowchart illustrating an exemplary method for processing a current block in a current picture implemented in an image or video encoder or decoder according to various embodiments of MIP mode mapping. The image or video encoder or decoder receives input data associated with the current block in step S502. A Matrix-based Intra Prediction (MIP) mode index of an MIP block is mapped to a default mode in step S504. The MIP block is coded by an MIP mode according to predicted samples generated by a matrix, and the MIP block is a reference block of the current block according to some embodiments or the MIP block is the current block according to another embodiment. In one embodiment, the image or video encoder or decoder derives Direct Mode (DM) for the current block according to the default mode in step S506 when the current block is a chroma block and the MIP block is a corresponding luma block. In another embodiment, the image or video encoder or decoder derives intra Most Probable Mode (MPM) for the current block by incorporating the default mode in step S506 when the current block is an intra coded block and the MIP block is a neighboring block of the current block. In yet another embodiment, the image or video encoder or decoder selects a secondary transform set for a transform block in the current block according to the default mode in step S506 when the current block is coded in the MIP mode and is processed or to be processed by secondary transform. Finally, the current block is encoded or decoded in step S508.

Transpose Flag Signaling In some embodiments of the present invention, when a current block is coded by the MIP mode, MIP mode information is signaled by signaling a matrix index and signaling if it is a transpose mode. The matrix index is the MIP mode index of the current block in the embodiments. In one embodiment, the MIP mode information of the current block is signaled by first signaling the matrix index and then signaling if it is the transpose mode. In another embodiment, the MIP mode information of the current block is signaled by first signaling if it is the transpose mode and then signaling the matrix index.

Figure 4:
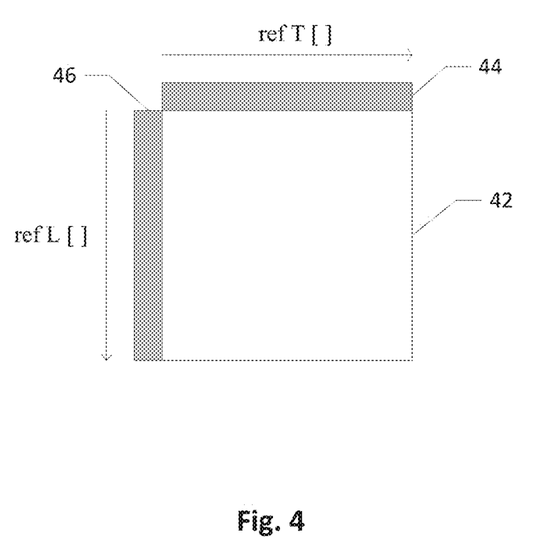
FIG. 4 demonstrates an example of deriving reference samples for a block coded or to be coded in the MIP mode from top boundary reference samples and left boundary reference samples.

FIG. 4 illustrates an example of preparing reference samples for coding a current block by the MIP mode. An input vector of the MIP method for a current block 42 is obtained from top boundary reference samples 44 and left boundary reference samples 46 of the current block 42 as shown in FIG. 4. The top boundary reference samples 44 and the left boundary reference samples 46 are reduced into reduced top boundary samples and reduced left boundary samples respectively. The video encoding system selects a matrix set S0, S1, or S2 for the current block, then selects a matrix from the selected matrix set, and determines if transposing needs to be applied. For example, the video encoding system selects the matrix set S0 when the size of the current block is 4×4 or selects the matrix set S1 when the size of the current block is one of 4×8, 8×4, 8×8, 4×N, or N×4, otherwise the video encoding system selects the matrix set S2. In one example, there are 16 matrices in the matrix set S0, 8 matrices in the matrix set S1, and 6 matrices in the matrix set S2. The input vector for the MIP method is a reduced boundary vector obtained by concatenating the reduced top boundary samples and the reduced left boundary reference samples, where the reduced top boundary samples are placed before the reduced left boundary samples when it is not transposed, and the reduced left boundary samples are placed before the reduced top boundary samples when it is transposed. A reduced prediction signal for the current block is generated by multiplying the input vector with the selected matrix then adding an offset. The reduced prediction signal for the current block is replaced by its transpose if transposing is applied. A transpose flag for the current block is signaled in the video bitstream to indicate whether transposing is applied in coding the current block by the MIP mode. A matrix index for the current block is also signaled in the video bitstream to indicate which matrix of the selected matrix set is used for predicting the current block. Since a transpose flag is signaled with the matrix index in these embodiments, the number of matrices in each matrix set is equal to the number of modes in the matrix set, and the matrix index is equal to the MIP mode index. In one embodiment, an MIP mode index is signaled before a transpose flag for each MIP coded block, and in another embodiment, a transpose flag is signaled before a MIP mode index for each MIP coded block. Syntax used for signaling the MIP mode index is coded in a fixed length codeword according to an embodiment. The video decoding system parses a transpose flag and a MIP mode index for each MIP coded block. For a current block coded by the MIP mode, the video decoding system selects a matrix set according to the size of the current block, and determines a matrix from the selected matrix set according to the MIP mode index. The video decoding system prepares reference samples for the current block according to the transpose flag and generates a reduced prediction signal by matrix vector multiplication. The reduced prediction signal is further transposed if the transpose flag indicates transposing is applied. The current block is decoded according to the reduced prediction signal.

The embodiments of signaling transpose flags for MIP coded blocks simplify the conventional MIP method by removing the matrix index derivation and transpose flag derivation at the decoder. In the conventional MIP method, the number of modes in the matrix set S0 is 32, where the first 16 modes are 16 different matrices and the last 16 modes are the transpose of the first 16 matrices. The matrix index is derived by subtracting the signaled MIP mode index by 16. The transpose flag is derived by checking whether the MIP mode index is larger than or equal to 16. Similarly, the number of modes in the matrix set S1 is 16 while the number of modes in the matrix set S2 is 12. Eight of the 16 modes in the matrix set S1 and six of the 12 modes in the matrix set S2 refer to applying transposing. The matrix index in the matrix set S1 and S2 are derived by subtracting the signaled MIP mode index by 8 and 6, respectively. The transpose flag for blocks in set S1 and S2 is derived by checking whether MIP mode index is larger than or equal to 8 and 6, respectively.

Figure 6:
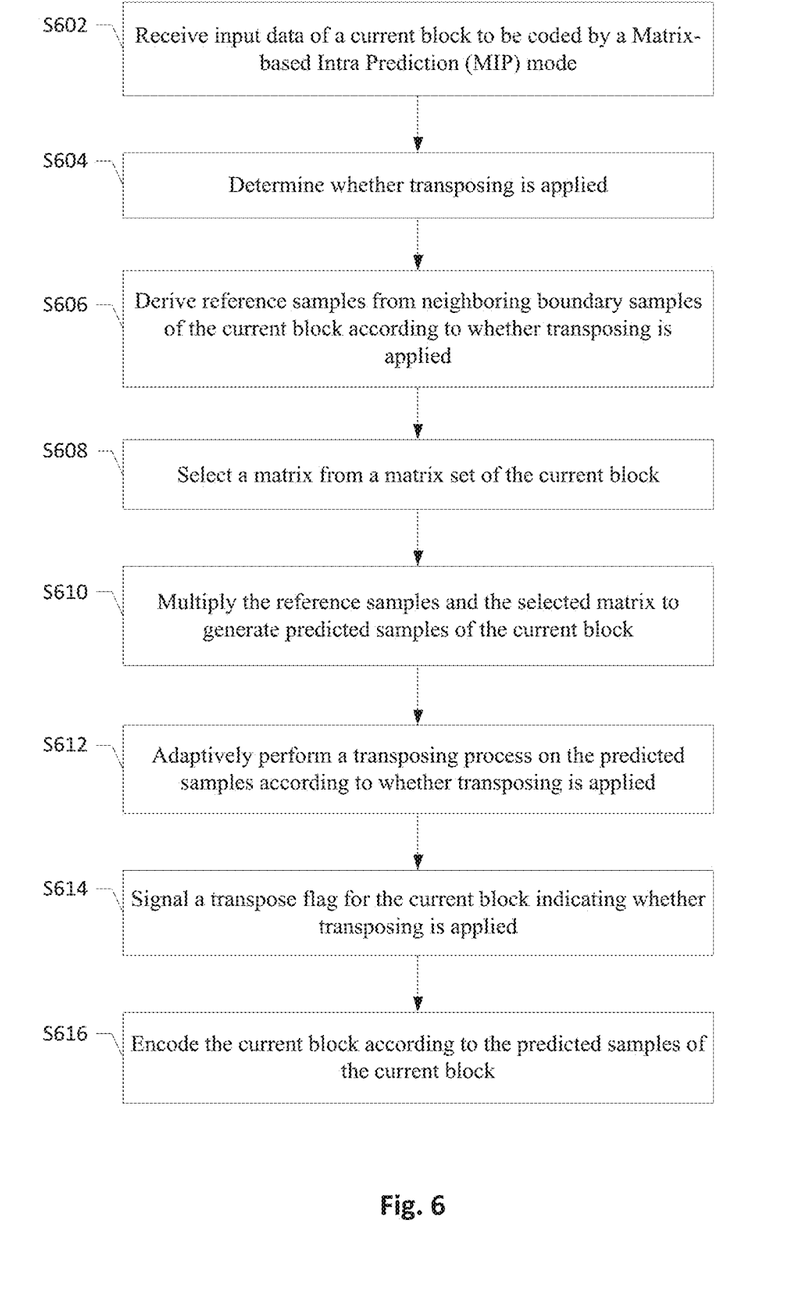
FIG. 6 is a flowchart illustrating an exemplary encoding method for encoding a current block in an MIP mode according to an embodiment of transpose flag signaling.

FIG. 6 is a flowchart illustrating an exemplary encoding method for encoding a current block by an MIP mode according to an embodiment of the present invention. The encoding method may be implemented in an image or video encoder. The image or video encoder receives input data associated with the current block to be coded in the MIP mode in step S602, and determines whether transposing is applied in coding the current block in step S604. To predict the current block in the MIP mode, reference samples from neighboring boundary samples of the current block are first derived according to whether transposing is applied in step S606, a matrix is selected from a matrix set of the current block in step S608, and predicted samples of the current block are generated by multiplying the reference samples and the selected matrix in step S610. In case when transposing is applied, a transposing process is performed on the predicted samples in step S612 to replace the predicted samples with a transpose of the predicted samples. A transpose flag for the current block is signaled in a video bitstream indicating whether transposing is applied to the current block in step S614. The image or video encoder encodes the current block according to the predicted samples of the current block in step S616.

The encoding method for encoding the current block by the MIP mode may further include clipping the predicted samples to a rational range and up-sampling the clipped predicted samples, and the transposing process is adaptively performed on the clipped predicted samples of the current block before up-sampling. The encoding method signals a matrix index for the current block determined in step S608 which indicates the matrix selected from the matrix set of the current block. The matrix set of the current block is determined based on a size of the current block. According to an embodiment of the present invention, the transpose flag for the current block is signaled before signaling the matrix index for the current block.

Figure 7:
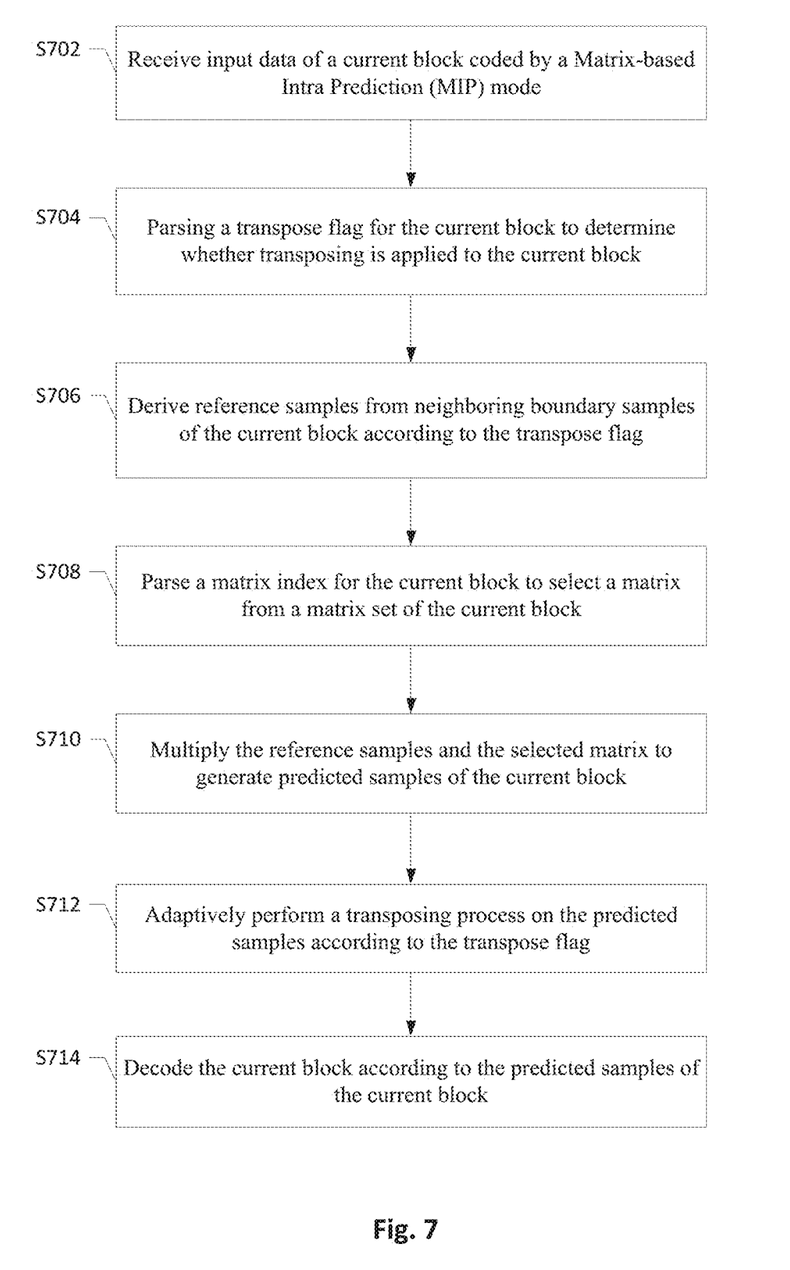
FIG. 7 is a flowchart illustrating an exemplary decoding method for decoding a current block in an MIP mode according to an embodiment of transpose flag signaling.

FIG. 7 is a flowchart illustrating an exemplary decoding method for decoding a current block by an MIP mode according to an embodiment of the present invention. The decoding method may be implemented in an image or video decoder. The image or video decoder receives input data associated with a current block coded by the MIP mode in step S702, and parses a transposing flag for the current block to determine whether transposing is applied to the current block in step S704. Reference samples of the current block are derived from neighboring boundary samples of the current block in step S706. The image or video decoder parses a matrix index for the current block to select a matrix from a matrix set of the current block in step S708, and multiplies the reference samples with the selected matrix to generate predicted samples of the current block in step S710. A transposing process is adaptively performed on the predicted samples of the current block according to the parsed transposing flag in step S712. The image or video decoder decodes the current block according to the predicted samples of the current block in step S714.

The decoding method for decoding the current block by the MIP mode may further include clipping the predicted samples to a rational range and up-sampling the clipped predicted samples, and the transposing process is adaptively performed on the clipped predicted samples of the current block before up-sampling. In step S708, the matrix set of the current block is determined based on a size of the current block. According to an embodiment of the present invention, the transpose flag for the current block is parsed before parsing the matrix index for the current block.

MPM Removal in MIP Method In the conventional MIP method, three MPMs are determined when a current block is coded by the MIP mode. Two tables are required to derive the three MPMs for a current block coded in the MIP mode. The two tables map regular intra mode indices to MIP mode indices. The first table maps 65 angular mode indices to 33 angular mode indices and the second table maps 33 angular mode indices to MIP mode indices. There is another table that stores default MPM lists. Some embodiments of the present invention remove MPMs for MIP coded blocks, and therefore the tables used for MPMs as mentioned above are removed. In some embodiments of the present invention, syntax used to signal each MIP mode index is changed to a fixed length codeword. After removing the MPMs for a MIP coded block according to one embodiment, an MIP mode index for this MIP coded block is signaled using a fixed length codeword, where a number of bits for the fixed length codeword may depend on the number of the MIP modes. For example, in cases when 35 MIP modes can be used for 4×4 blocks in group 1, 19 MIP modes can be used for 8×8, 8×4, and 4×8 blocks in group 2, and 11 MIP modes can be used for blocks with other sizes in group 3, the fixed length codewords with 6 bits, 5 bits, and 4 bits are used for group 1, group 2, and group 3, respectively.

By combining the method of mapping all MIP mode indices to a default mode and the method of removing MPMs for MIP coded blocks, the first table used to map 65 regular intra mode indices to 33 angular mode indices, the second table used to map 33 angular mode indices to MIP mode indices, the default MPM list table, and the table used to map MIP mode indices to regular intra mode indices can all be removed to reduce the required memory and computational complexity.

Power-of-two Number of MIP Modes In one embodiment, the MIP mode index or the matrix index is coded by fixed length codewords. Since the number of MIP modes or the number of matrices are different for blocks with different sizes or shapes, the length of the codewords depends on the size, width, height, or both the width and height. In one embodiment, the codeword length used in smaller blocks is larger or longer than that the codeword length used in larger blocks. In another embodiment, the numbers of MIP modes or matrices for various block sizes are chosen to be power-of-two numbers in order to efficiently use the fixed length codewords. That is, for each block coded by the MIP modes, a power-of-two number of MIP modes or matrices can be selected. For example, the number of MIP modes or matrices for 4×4 blocks in group 1 is set to 32, the number of MIP modes or matrices for 4×8 and 8×4 blocks in group 2 is set to 16, and the number of MIP modes or matrices for other blocks is set to 8.

Video Encoder and Decoder Implementations The foregoing proposed image or video processing methods can be implemented in video encoders or decoders. For example, a proposed image or video processing method is implemented in an intra prediction module of an encoder, and/or an intra prediction module of a decoder. Alternatively, any of the proposed methods is implemented as a circuit coupled to the intra prediction module of the encoder and/or the intra prediction module of the decoder, so as to provide information needed by the intra prediction module.

FIG. 8 illustrates an exemplary system block diagram for a Video Encoder 800 implementing a video processing method of the present invention. For a current block to be coded by intra prediction, Intra Prediction module 810 selects a prediction mode for the current block from one of a MIP mode and a regular mode. Intra Prediction module 810 generates predicted samples for the current block, which is also referred to as an intra predictor for the current block, based on reconstructed video data of a current picture. If the current block is predicted by the MIP mode, reference samples of the current block are derived from neighboring boundary samples of the current block and then multiplied by a matrix to generate intermediate predicted samples. The intermediate predicted samples may be clipped to a rational range and up-sampled to generate predicted samples for the current block. For example, the rational range is [0, 1<<Bit-Depth−1], and a bi-linear interpolation filter is used for up-sampling. In some embodiments of MIP mode mapping, an MIP mode index of the current block is mapped to a default mode, thus DM derivation for a corresponding chroma block, intra MPM derivation for a neighboring block, or secondary transform set selection for a transform block in the current block is conducted based on the default mode. In some embodiments of transpose flag signaling, a transpose flag indicating whether transposing is applied in coding the current block is signaled in an encoded video bitstream. If the regular mode is selected for encoding the current block, Intra Prediction module 810 selects an intra prediction mode for the current block and generates predicted samples for the current block according to the intra prediction mode. Inter Prediction module 812 performs motion estimation (ME) and motion compensation (MC) to provide inter predictors based on video data from other picture or pictures. For each block, either Intra Prediction module 810 or Inter Prediction module 812 supplies the selected predictor to Adder 816 to form prediction errors, also called prediction residues.

The prediction residues of the current block are further processed by Transformation module (T) 818 followed by Quantization module (Q) 820. The transformed and quantized residual signal is then encoded by Entropy Encoder 834 to form the encoded video bitstream. The encoded video bitstream is then packed with side information such as the transpose flag for each MIP coded block. The transformed and quantized residual signal of the current block is processed by Inverse Quantization module (IQ) 822 and Inverse Transformation module (IT) 824 to recover the prediction residues. As shown in FIG. 8, the prediction residues are recovered by adding back to the selected predictor at Reconstruction module (REC) 826 to produce reconstructed video data. The reconstructed video data may be stored in Reference Picture Buffer (Ref. Pict. Buffer) 832 and used for prediction of other pictures. The reconstructed video data from REC 826 may be subject to various impairments due to the encoding processing, consequently, in-loop processing Deblocking Filter (DF) 828 and Sample Adaptive Offset (SAO) 830 are applied to the reconstructed video data before storing in the Reference Picture Buffer 832 to further enhance picture quality. DF 828 and SAO 830 are examples of in-loop processing filters applied in Video Encoder 800, any other combination of in-loop processing filters may be chosen to filter the reconstructed video data. Syntax associated with information for the in-loop processing DF 828 and SAO 830 are provided to Entropy Encoder 834 for incorporation into the encoded video bitstream.

An exemplary corresponding Video Decoder 900 for decoding data encoded by Video Encoder 800 of FIG. 8 is shown in FIG. 9. The encoded video bitstream is the input to Video Decoder 900 and is decoded by Entropy Decoder 910 to parse and recover the transformed and quantized residual signal and other system information. The decoding process of Decoder 900 is similar to the reconstruction loop at Encoder 800, except Decoder 900 only requires motion compensation prediction in Inter Prediction module 914. Each block is decoded by either Intra Prediction module 912 or Inter Prediction module 914. Switch 916 selects an intra predictor from Intra Prediction module 912 or inter predictor from Inter Prediction module 914 according to decoded mode information of a current block. Intra Prediction module 912 parses syntax to determine whether the current block is coded in a regular intra prediction mode or an MIP mode, and if the current block is coded by the MIP mode, reference samples are derived from neighboring boundary samples in the current picture and multiplied by a matrix to generate intermediate predicted samples. The matrix is selected according to a matrix index parsed from the encoded video bitstream. Intra Prediction module 912 clips the intermediate predicted samples then performs an up-sampling process on the clipped intermediate predicted samples to generate an intra predictor for the current block. In some embodiments of MIP mapping, the MIP mode index of each MIP coded block is mapped to a default mode for DM derivation, intra MPM derivation, or secondary transform set selection. In some embodiments of transpose flag signaling, a transpose flag is parsed for each MIP coded block, and the reference samples and the intra predictor for each MIP coded block are derived according to the corresponding transpose flag. Intra Prediction module 912 derives an intra predictor for the current block according to an intra prediction mode if the current block is not coded by matrix based intra prediction. The transformed and quantized residual signal associated with each block is recovered by Inverse Quantization module (IQ) 920 and Inverse Transformation module (IT) 922. The recovered transformed and quantized residual signal is reconstructed by adding back the Intra or Inter predictor in REC 918 to produce reconstructed video. The reconstructed video is further processed by DF 924 and SAO 926 to generate final decoded video. If the currently decoded picture is a reference picture, the reconstructed video of the currently decoded picture is also stored in Ref. Pict. Buffer 928 for later pictures in a decoding order.

Various components of Video Encoder 800 and Video Decoder 900 in FIG. 8 and FIG. 9 may be implemented by hardware components, one or more processors configured to execute program instructions stored in a memory, or a combination of hardware and processor. For example, a processor executes program instructions to control clipping intermediate predicted samples before up-sampling. The processor is equipped with a single or multiple processing cores. In some examples, the processor executes program instructions to perform functions in some components in Encoder 800 and Decoder 900, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 8 and 9 Encoder 800 and Decoder 900 may be implemented in the same electronic device, so various functional components of Encoder 800 and Decoder 900 may be shared or reused if implemented in the same electronic device. For example, one or more of Reconstruction module 826, Inverse Transformation module 824, Inverse Quantization module 822, Deblocking Filter 828, Sample Adaptive Offset 830, and Reference Picture Buffer 832 in FIG. 8 may also be used to function as Reconstruction module 918, Inverse Transformation module 922, Inverse Quantization module 920, Deblocking Filter 924, Sample Adaptive Offset 926, and Reference Picture Buffer 928 in FIG. 9, respectively.

Embodiments of the matrix based intra prediction method for image or video coding system may be implemented in a circuit integrated into a video compression chip or program code integrated into video compression software to perform the processing described above. For examples, clipping intermediate predicted samples before up-sampling in the MIP method may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing video data in an image or video encoding system, comprising:
   receiving input data associated with a current block to be coded by a Matrix-based Intra Prediction (MIP) mode in a current picture;
   determining whether transposing is applied in coding the current block by the MIP mode;
   signaling a transpose flag for the current block indicating whether transposing is applied based on the determining;
   deriving reference samples of the current block from neighboring boundary samples of the current block in the current picture according to whether transposing is applied;
   selecting a matrix for the current block from a matrix set of the current block based on information about the MIP mode, wherein the transpose flag is signaled before the information about the MIP mode is signaled;
   generating predicted samples of the current block by multiplying the reference samples and the matrix;
   adaptively performing a transposing process by replacing the predicted samples of the current block with a transpose of the predicted samples according to whether transposing is applied; and
   encoding the current block in the current picture according to the predicted samples of the current block.

2. The method of claim 1, further comprising clipping the predicted samples to a rational range and up-sampling the clipped predicted samples, wherein the transposing process is adaptively performed on the clipped predicted samples of the current block before up-sampling.

3. The method of claim 1, further comprising signaling a matrix index for the current block indicating which matrix is selected from the matrix set of the current block, wherein the matrix set is determined based on a size of the current block.

4. The method of claim 3, wherein MIP mode information of the current block is signaled by first signaling the transpose flag and then signaling the matrix index.

5. The method of claim 1, wherein the step of deriving reference samples of the current block from neighboring boundary samples of the current block further comprises obtaining top boundary reference samples and left boundary reference samples, reducing the top boundary reference samples and left boundary reference samples into reduced top boundary samples and reduced left boundary samples, and concatenating the reduced top boundary samples and the reduced left boundary samples according to whether transposing is applied.

6. An apparatus for performing image or video processing, comprising: a computer processor configured for receiving input data and programming executable on the computer processor for image or video encoding by performing steps comprising:
   receiving input data associated with a current block to be coded by a Matrix-based Intra Prediction (MIP) mode in a current picture;
   determining whether transposing is applied in coding the current block by the MIP mode;
   signaling a transpose flag for the current block indicating whether transposing is applied based on the determining;
   deriving reference samples of the current block from neighboring boundary samples of the current block in the current picture according to whether transposing is applied;
   selecting a matrix for the current block from a matrix set of the current block based on information about the MIP mode, wherein the transpose flag is signaled before the information about the MIP mode is signaled;
   generating predicted samples of the current block by multiplying the reference samples and the matrix;
   adaptively performing a transposing process by replacing the predicted samples of the current block with a transpose of the predicted samples according to whether transposing is applied; and
   encoding the current block in the current picture according to the predicted samples of the current block.

7. A method of processing video data in an image or video decoding system, comprising:
   receiving input data associated with a current block coded by a Matrix-based Intra Prediction (MIP) mode in a current picture;
   parsing a transpose flag for the current block indicating whether transposing is applied;
   determining whether transposing is applied in coding the current block by the MIP mode based on the transpose flag;
   deriving reference samples of the current block from neighboring boundary samples of the current block in the current picture according to whether transposing is applied;
   selecting a matrix for the current block from a matrix set of the current block based on information about the MIP mode, wherein the transpose flag is parsed before the information about the MIP mode is parsed;
   generating predicted samples of the current block by multiplying the reference samples and the matrix;
   adaptively performing a transposing process by replacing the predicted samples of the current block with a transpose of the predicted samples according to whether transposing is applied; and
   decoding the current block in the current picture according to the predicted samples of the current block.

8. The method of claim 7, further comprising clipping the predicted samples to a rational range and up-sampling the clipped predicted samples, wherein the transposing process is adaptively performed on the clipped predicted samples of the current block before up-sampling.

9. The method of claim 7, further comprising parsing a matrix index for the current block indicating which matrix is selected from the matrix set of the current block, wherein the matrix set is determined based on a size of the current block.

10. The method of claim 9, wherein MIP mode information of the current block is parsed by first parsing the transpose flag and then parsing the matrix index.

11. The method of claim 7, wherein the step of deriving reference samples of the current block from neighboring boundary samples of the current block further comprises obtaining top boundary reference samples and left boundary reference samples, reducing the top boundary reference samples and left boundary reference samples into reduced top boundary samples and reduced left boundary samples, and concatenating the reduced top boundary samples and the reduced left boundary samples according to whether transposing is applied.

12. An apparatus for performing image or video processing, comprising: a computer processor configured for receiving input data and programming executable on the computer processor for image or video decoding by performing steps comprising:

receiving input data associated with a current block coded by a Matrix-based Intra Prediction (MIP) mode in a current picture;

parsing a transpose flag for the current block indicating whether transposing is applied;

determining whether transposing is applied in coding the current block by the MIP mode based on the transpose flag;

deriving reference samples of the current block from neighboring boundary samples of the current block in the current picture according to whether transposing is applied;

selecting a matrix for the current block from a matrix set of the current block based on information about the MIP mode, wherein the transpose flag is parsed before the information about the MIP mode is parsed;

generating predicted samples of the current block by multiplying the reference samples and the matrix;

adaptively performing a transposing process by replacing the predicted samples of the current block with a transpose of the predicted samples according to whether transposing is applied; and decoding the current block in the current picture according to the predicted samples of the current block.

* * * * *